US011314715B2

(12) United States Patent
Lambert et al.

(10) Patent No.: US 11,314,715 B2
(45) Date of Patent: Apr. 26, 2022

(54) REFINING LOCATION ESTIMATES AND REVERSE GEOCODING BASED ON A USER PROFILE

(71) Applicant: Google LLC, Mountain View, CA (US)

(72) Inventors: Christopher Lambert, San Francisco, CA (US); Mike Chu, Los Altos Hills, CA (US); Rohan Seth, San Francisco, CA (US)

(73) Assignee: Google LLC, Mountain View, CA (US)

( * ) Notice: Subject to any disclaimer, the term of this patent is extended or adjusted under 35 U.S.C. 154(b) by 345 days.

(21) Appl. No.: 15/908,934

(22) Filed: Mar. 1, 2018

(65) Prior Publication Data

US 2018/0189341 A1     Jul. 5, 2018

Related U.S. Application Data

(63) Continuation of application No. 14/545,018, filed on Mar. 16, 2015, now Pat. No. 9,953,047, which is a
(Continued)

(51) Int. Cl.
*G06F 16/00* (2019.01)
*G06F 16/23* (2019.01)
(Continued)

(52) U.S. Cl.
CPC .............. *G06F 16/23* (2019.01); *G01S 5/02* (2013.01); *G01S 5/021* (2013.01); *G01S 5/0257* (2013.01);
(Continued)

(58) Field of Classification Search
CPC ...... G06F 16/2228; G06F 16/23; G06F 16/29; G06F 16/9537; G06F 16/955;
(Continued)

(56) References Cited

U.S. PATENT DOCUMENTS 6,138,026 A    10/2000  Irvin
7,743,056 B2    6/2010  Meisels et al.
(Continued)

FOREIGN PATENT DOCUMENTS

JP    2007178271 A    7/2007
JP    2008-242408     10/2008
WO      03058928 A1    7/2003

OTHER PUBLICATIONS

Extended European Search Report for European Patent Application No. 18166570.4, dated Jun. 25, 2018. 8 pages.
(Continued)

*Primary Examiner* — Vincent F Boccio
(74) *Attorney, Agent, or Firm* — Lerner, David, Littenberg, Krumholz & Mentlik, LLP

(57) ABSTRACT

The present invention pertains to enhancement or refinement of estimated locations based upon user-specific information. Upon user authorization, geographical information is extracted from a number of user-related sources, including the web browser history, search history, maps history, address book, e-mail archives and calendar entries. Such information is used to build a spatial index of specific physical locations for a geocoded result set. From this, heat maps identifying particular locations from the user-related sources are created for different periods of time. The heat maps may be used to refine an initial location estimate of the user. This may be done by determining whether one or more positions in a given heat map provide a more accurate position of the user than the initial estimate. If so, a best position is selected. This can be used to provide enhanced driving directions to the user.

18 Claims, 7 Drawing Sheets

Related U.S. Application Data continuation of application No. 12/437,718, filed on May 8, 2009, now abandoned.

(51) Int. Cl.

| | |
|---|---|
| *H04W 4/029* | (2018.01) |
| *G06F 16/29* | (2019.01) |
| *G06F 16/955* | (2019.01) |
| *G06F 16/22* | (2019.01) |
| *G06F 16/9537* | (2019.01) |
| *G06Q 30/02* | (2012.01) |
| *H04W 4/18* | (2009.01) |
| *G01S 5/02* | (2010.01) |
| *H04L 67/306* | (2022.01) |
| *H04L 67/52* | (2022.01) |
| *G01C 21/36* | (2006.01) |

(52) U.S. Cl.
CPC .......... *G06F 16/2228* (2019.01); *G06F 16/29* (2019.01); *G06F 16/955* (2019.01); *G06F 16/9537* (2019.01); *G06Q 30/02* (2013.01); *H04L 67/18* (2013.01); *H04L 67/306* (2013.01); *H04W 4/029* (2018.02); *H04W 4/18* (2013.01); *G01C 21/3682* (2013.01)

(58) Field of Classification Search
CPC .. G06F 16/228; G01C 21/3682; H04W 4/029; H04W 4/02; H04W 4/18; H04L 67/18; H04L 67/306; G01S 5/502; G01S 5/021; G01S 5/0257
USPC ......................................................... 707/743
See application file for complete search history.

(56) References Cited

U.S. PATENT DOCUMENTS

| | | | | |
|---|---|---|---|---|
| 7,774,227 | B2* | 8/2010 | Srivastava | G06Q 10/04 705/7.34 |
| 7,856,370 | B2* | 12/2010 | Katta | G06Q 10/06 705/7.34 |
| 8,260,553 | B2 | 9/2012 | Klein et al. | |
| 9,497,795 | B1* | 11/2016 | Billman | G06Q 30/0261 |
| 2003/0063072 | A1 | 4/2003 | Brandenberg et al. | |
| 2003/0126100 | A1* | 7/2003 | Chithambaram | G06N 5/048 706/8 |
| 2004/0003042 | A1* | 1/2004 | Horvitz | G06Q 10/109 709/204 |
| 2004/0147265 | A1* | 7/2004 | Kelley | G06Q 30/02 455/445 |
| 2004/0162090 | A1 | 8/2004 | Suryanarayana et al. | |
| 2005/0246334 | A1 | 11/2005 | Tao et al. | |
| 2006/0059152 | A1 | 3/2006 | Nakamura | |
| 2006/0270421 | A1 | 11/2006 | Phillips et al. | |
| 2006/0276201 | A1 | 12/2006 | Dupray | |
| 2007/0082677 | A1 | 4/2007 | Hart et al. | |
| 2008/0121690 | A1 | 5/2008 | Carani et al. | |
| 2008/0205768 | A1* | 8/2008 | Srivastava | G06Q 10/00 382/206 |
| 2008/0214157 | A1 | 9/2008 | Ramer et al. | |
| 2008/0249983 | A1 | 10/2008 | Meisels et al. | |
| 2008/0312942 | A1* | 12/2008 | Katta | G06Q 10/04 705/7.34 |
| 2009/0258656 | A1 | 10/2009 | Wang et al. | |

OTHER PUBLICATIONS

Ronda, Troy et al., "Appono: A Geolocator for the Internet," 6 p., Undated, but retrieved from the Internet on Feb. 10, 2009.
International Search Report, PCT/US10/33865, dated Jul. 9, 2010.
Rekimoto Junichi, Location Awareness Tokusyu, Human Interface Gakkaishi, Nihon, Tokutei Hieiri Katsudou Houjin, Human Interface Gakkai, Feb. 25, 2008, vol. 10, No. 1, pp. 21 to 26.
Japanese Office Action for Application No. 2012-509972 dated Dec. 13, 2013.
Extended European Search Report for EP Patent Application No. 10772823.0, dated Nov. 27, 2015.
Extended European Search Report for EP Patent Application No. 16194716.3, dated Feb. 15, 2017.

* cited by examiner

100

REFINING LOCATION ESTIMATES AND REVERSE GEOCODING BASED ON A USER PROFILE

CROSS-REFERENCE TO RELATED APPLICATIONS

The present application is a continuation of U.S. patent application Ser. No. 14/545,018, filed Mar. 16, 2015, which is a continuation of U.S. patent application Ser. No. 12/437,718, filed on May 8, 2009, which is abandoned, the disclosures of which are incorporated herein by reference.

BACKGROUND OF THE INVENTION

1. Field of the Invention

The present invention relates generally to location-based services and applications for mobile and desktop users. More particularly, the present invention relates to refining locations or positions in view of user-specific information.

2. Description of Related Art

Location-based services and applications are becoming more and more popular as the number and types of portable electronic devices increases. Devices such as mobile telephones, PDAs and laptop/palmtop computers may be used indoors and outdoors in one location or while on the go. The approximate location of the user's device or a place of interest may be found with a number of different technologies. One such technology is satellite-based location using the Global Positioning System ("GPS"). Another location technology employs triangulation among multiple cell towers to estimate the device's position. A further location technology is IP geocoding. In this technique, a device's IP address may be mapped to a physical location.

Unfortunately, existing location technologies have limited accuracies. For instance, cell tower triangulation and IP geocoding may provide a very coarse location estimate. Depending upon signal strength, tower placement, interference and other factors, triangulation errors may be on the order of hundreds of feet or even miles. IP geocoding may be even more unreliable, with errors of hundreds of miles possible. Even GPS, which may be accurate to 10-20 feet or better, may be unusable in indoor environments such as shopping plazas, office building, subways and the like.

Aspects of the present invention address these and other problems to provide refined or enhanced positioning information based upon user-specific information.

BRIEF SUMMARY OF THE INVENTION

In accordance with one embodiment, a method for refining physical location information for a place of interest comprises analyzing at least one electronic database containing information about a selected user to determine whether the at least one electronic database includes geographical information; extracting a result set from the at least one electronic database, the result set including the geographical information; performing geopoint extraction on the result set to obtain specific physical locations for each item of geographical information in the result set; constructing a spatial index containing the specific physical locations and time information for one or more of the specific physical locations; creating at least one heat map containing selected ones of the specific physical locations based upon the time information.

In one example, the method further comprises ranking results in the spatial index to indicate a confidence in the specific physical locations. In this case, the confidence may be determined by accuracy of the geopoint extraction. Alternatively, the time information may indicate at least one of a time an event occurred and a time that selected information about the event expired. Here, different heat maps may display different ones of the selected specific physical locations based upon the ranked results in the spatial index and the method may further comprise presenting at least one of the heat maps on a display device.

In another embodiment, a processing system for processing geographical information comprises at least one processor, a geolocation module associated with the at least one processor, and memory for storing data. The memory is electrically coupled to the at least one processor. The geolocation module is configured to analyze at least one electronic database containing information about a selected user to determine whether the at least one electronic database includes geographical information, to extract a result set from the at least one electronic database (the result set including the geographical information) to perform geopoint extraction on the result set to obtain specific physical locations for each item of geographical information in the result set, to construct a spatial index containing the specific physical locations and time information for one or more of the specific physical locations, to store the spatial index in the memory of the processing system, and to create at least one heat map containing selected ones of the specific physical locations based upon the time information.

In one example, the geolocation module is further configured to transmit the at least one heat map to an authorized user for presentation on a display of a user device. In another example, the geolocation module includes a protected data fetcher for communicating with the at least one electronic database. The protected data fetcher is configured to search the at least one electronic database for geographical data contained in web pages and search histories.

In a further example, the specific physical locations maintained in the spatial index correspond to latitude and longitude coordinates of physical addresses. And in yet another example, each heat map presents the selected ones of the specific physical locations displays as ranked points of interest based upon the time information.

In accordance with another embodiment, a method for refining a location estimate of a user's physical location comprises estimating a current location of the user; comparing the estimated current location with one or more heat maps identifying specific physical locations in a predetermined geographical area, the one or more heat maps containing time information associated with one or more of the specific physical locations associated with the user, each heat map being derived from at least one electronic database containing information about the user; determining a set of relevant matching addresses from a selected one of the heat maps; analyzing the set of relevant matching addresses of the selected heat map that are within a preset distance of the estimated current location; determining whether a given one of the relevant matching addresses provides a more accurate location than the estimated current location; and if the given one of the relevant matching addresses provides a more accurate location than the estimated current location, selecting the given address as a refined position of the user.

In one example, the user's current location is estimated from historical user information stored in the at least one electronic database. In another example, at least one of the relevant matching addresses is selected based upon a frequency ranking representing how often the at least one relevant matching address appears in the at least one electronic database. In another example, at least one of the relevant matching addresses is selected based upon a timeliness ranking representing how often the at least one relevant matching address appears in the at least one electronic database at a given point in time.

In yet another embodiment, a location estimation system comprises a processor; a geolocation module associated with the at least one processor for executing operations; and memory for storing data, with the memory electrically coupled to the processor. The geolocation module is configured to estimate a current location of the user; compare the estimated current location with one or more heat maps identifying specific physical locations in a predetermined geographical area, the one or more heat maps containing time information associated with one or more of the specific physical locations associated with the user, each heat map being derived from at least one electronic database containing information about the user; determine a set of relevant matching addresses from a selected one of the heat maps; analyze the set of relevant matching addresses of the selected heat map that are within a preset distance of the estimated current location; determine whether a given one of the relevant matching addresses provides a more accurate location than the estimated current location; and if the given one of the relevant matching addresses provides a more accurate location than the estimated current location, select the given address as a refined position of the user.

In one example, the processor is configured to prefetch data associated with the user's estimated current location from a remote database and to store the prefetched data in the memory. In this case, the processor may be operable to present the refined position in the selected heat map on a display device. In yet another example, at least one of the relevant matching addresses is selected based upon a frequency ranking representing how often the at least one relevant matching address appears in the at least one electronic database. And in a further example, at least one of the relevant matching addresses is selected based upon a timeliness ranking representing how often the at least one relevant matching address appears in the at least one electronic database at a given point in time.

DETAILED DESCRIPTION

Figure 1A:
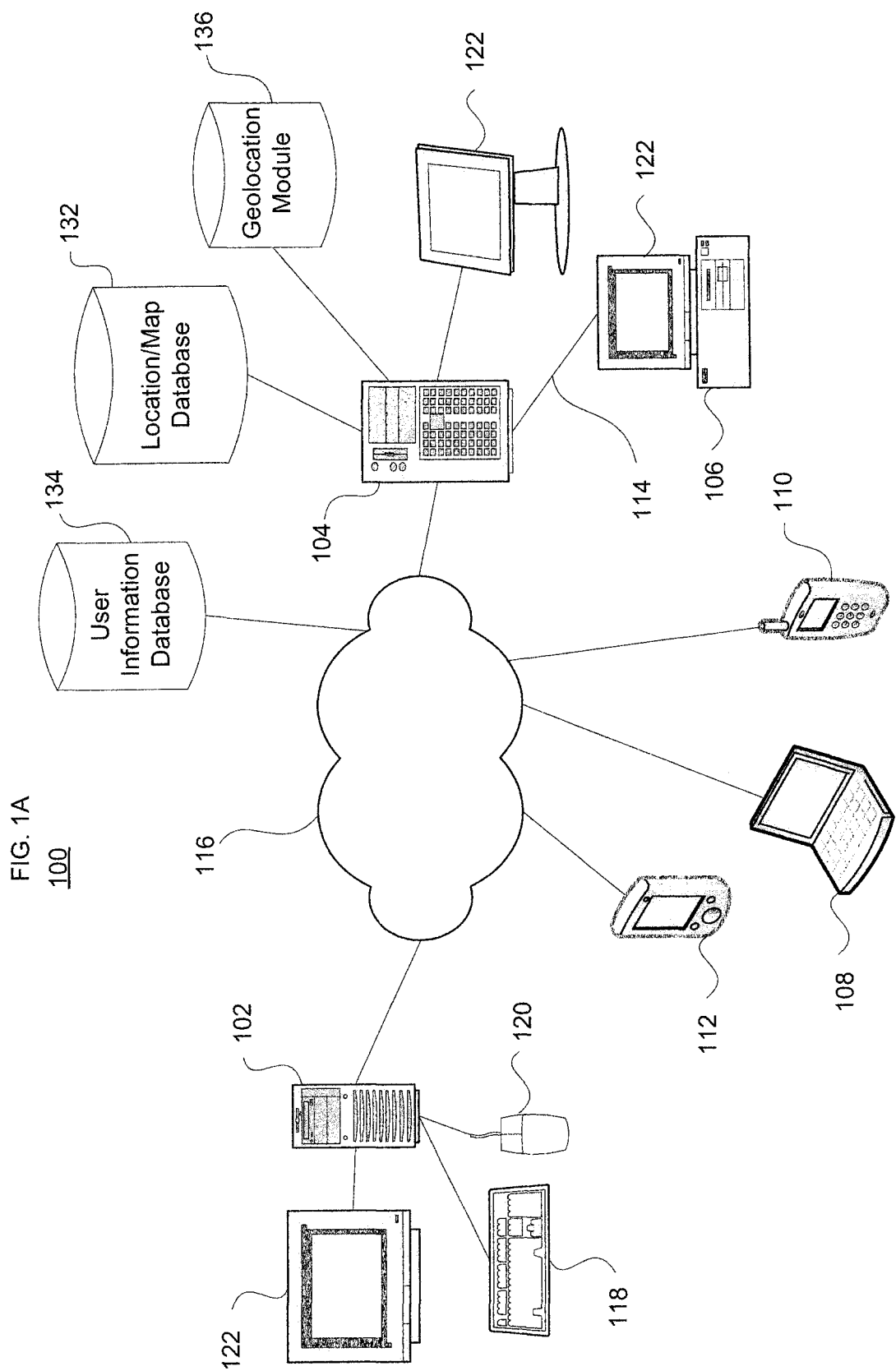
FIGS. 1A-B illustrate a computer network architecture in accordance with aspects of the present invention.

The aspects, features and advantages of the present invention will be appreciated when considered with reference to the following description of preferred embodiments and accompanying figures. The same reference numbers in different drawings may identify the same or similar elements. Furthermore, the following description does not limit the present invention; rather, the scope of the invention is defined by the appended claims and equivalents.

In accordance with aspects of the present invention, location information is coupled/linked to a precise street address or other specific location. As will be explained in more detail below, geographical information may be extracted from a number of sources associated with a user. These include the user's web browser's history, search history, address book, etc. Such information may be used in a number of ways to enhance location accuracy.

Systems and methods are used to create a time sensitive heat map of physical locations of interest to a given user. In one embodiment, physical locations are used to more accurately estimate the user's location. For instance, a coarse cell tower triangulation is refined in view of the user's home address. In another embodiment, user-associated geographic information is employed to provide enhanced detail during a reverse geocoding process.

Turning to FIG. 1, this illustration presents a schematic diagram of a computer system depicting various computing devices that can be used alone or in a networked configuration in accordance with aspects of the present invention. For example, this figure illustrates a computer network 100 having a plurality of computers 102, 104, 106 and 108 as well as other types of devices such as portable electronic devices such as a mobile phone 110 and a PDA 112. Various elements in the computer network 100 may be interconnected via a local or direct connection 114 and/or may be coupled via a communications network 116 such as a local area network ("LAN") such as a WiFi network, a wide area network ("WAN"), the Internet, etc. and which may be wired or wireless.

Figure 1B:
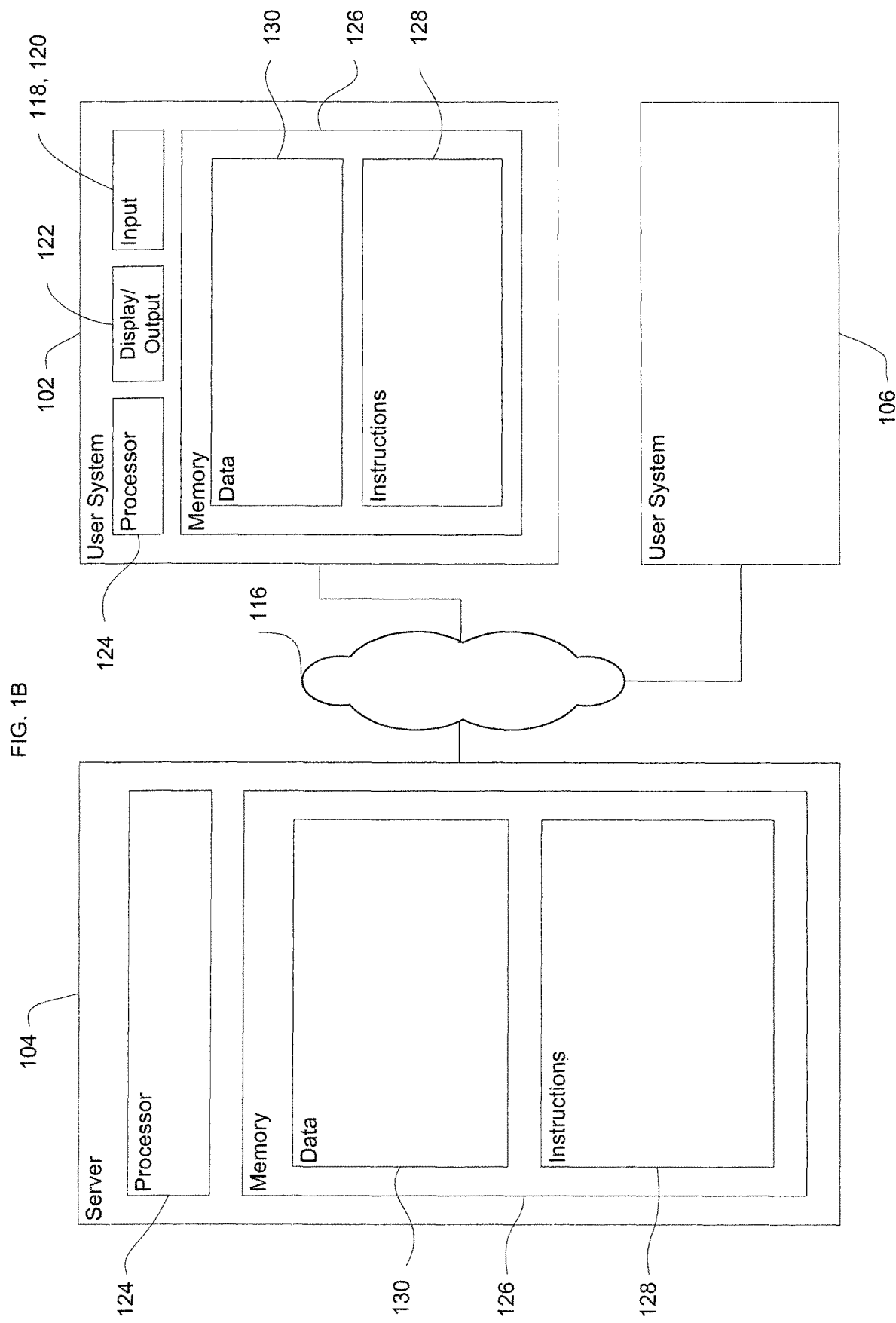

Each computer apparatus can include, for example, one or more computing devices having user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop/palmtop. As shown in FIG. 1B each computer such as computers 102 and 104 contains a processor 124, memory 126 and other components typically present in a computer.

Memory 126 stores information accessible by processor 124, including instructions 128 that may be executed by the processor 124 and data 130 that may be retrieved, manipulated or stored by the processor. The memory may be of any type capable of storing information accessible by the processor, such as a hard-drive, ROM, RAM, CD-ROM, flash memories, write-capable or read-only memories. The processor 324 may comprise any number of well-known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, or flat files. Map-type image data may be stored in flat files such as keyhole flat files ("KFF").

The data may also be formatted in any computer readable format such as, but not limited to, binary values, ASCII etc. Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable CD-ROM or DVD. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives, server farms or the like.

In one aspect, server 104 communicates with one or more client computers 102, 106 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 104 and client computers and other devices are capable of direct and indirect communication with other computers, such as over network 116. Although only a few computing devices are depicted in FIGS. 1A and 1B, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, DVD, or directly between two computer systems via a dial-up modem. In other aspects, the information may be transmitted in a non-electronic format and manually entered into the system.

Moreover, computers and client devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110.

As shown in FIG. 1A, the network 100 also includes a database 132. The database 132 may be directly or indirectly coupled to server 104. In an alternative, the database 132 may be part of or otherwise logically associated with the server 104. The database 132 may include different sets or types of data. By way of example only, the database 132 may maintain location and/or map-related data, which may be stored in one or more KFFs. The database 132 may store data 130 in one or more KFFs. Assets and other information, including satellite data, aerial photographs, digital maps, elevation data, GPS coordinates, etc. may be obtained from one or more sources (not shown). The database 132 may alternatively maintain information concerning one or more users/customers, as will be explained in detail below.

Figure 2:
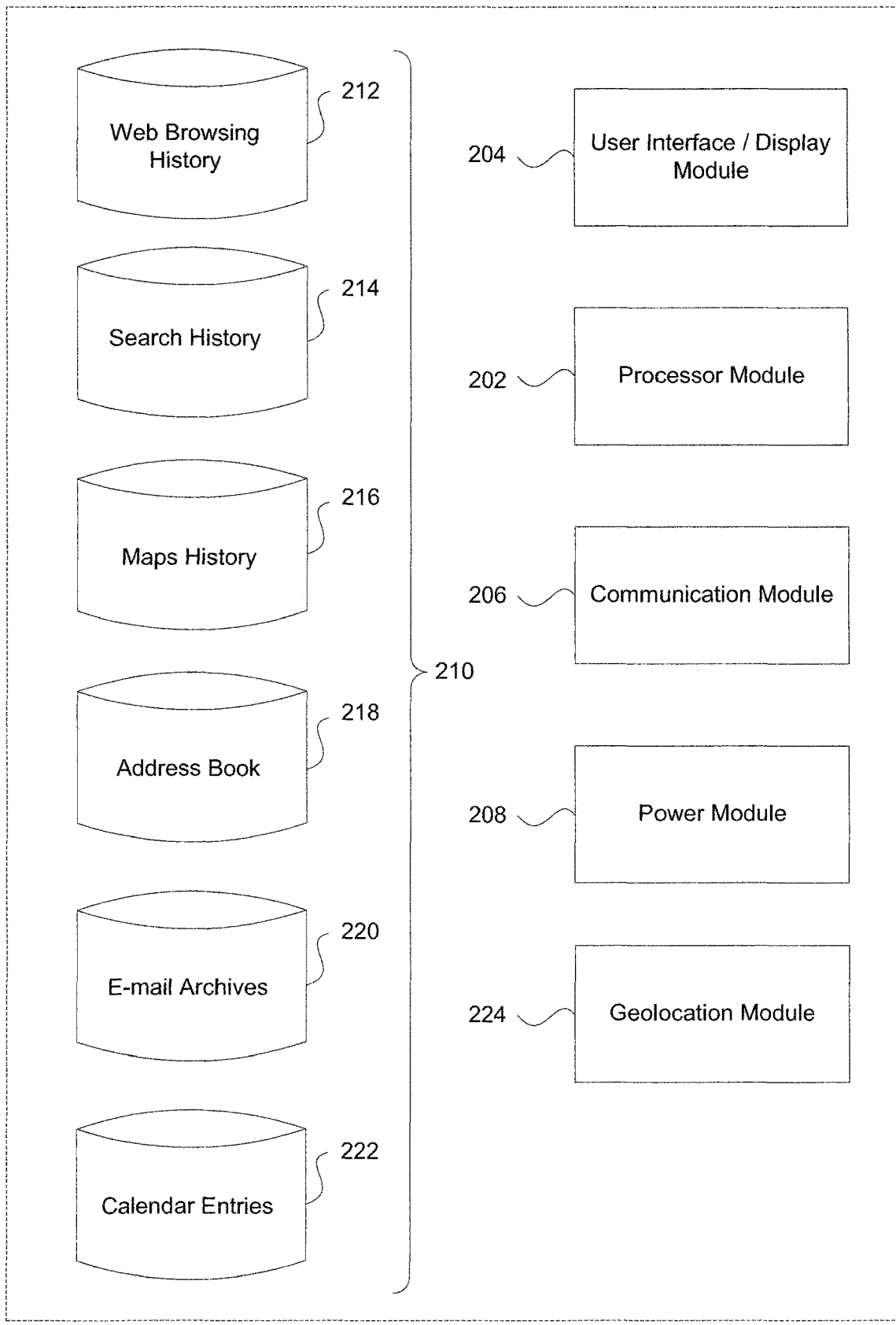
FIG. 2 illustrates a user device architecture in accordance with aspects of the present invention.

User devices such as laptop/palmtop 108, PDA 112 and mobile phone 110 may also include or store information in a database 134. Such information may include, for instance, a web browsing history, a website searching history, map data, the user's address book, e-mail archives and/or calendar entries. Given the sensitive nature of this information, the database 134 should securely store the data to prevent unauthorized access. Thus, the data may be encrypted for storage. In one example, the database 134 is maintained on network 100 separate from the user devices. In another example, the database 134 may be locally stored on one or more of the user devices, for example in memory 126 thereof. In a further example, the database 134 comprises multiple databases as shown in FIG. 2.

The database 134 may be part of the user device's architecture 200, which includes a processor module 202, a user interface/display module 204, a communication module 206, a power module 208 and a memory module 210. The processor module 202 may include a processor such as processor 124 or a controller and its attendant circuitry (e.g., local memory, floating point and/or integer processing elements, DMA unit). The user interface/display module 204 includes user inputs and outputs such as inputs 118 and 120 and display 122 of FIGS. 1A and 1B. The communication module 206 contains a protocol stack and attendant circuitry for communicating across a network such as network 116 or for direct device to device communication. The power module 208 provides power to the various modules of the architecture 200, and may include a rechargeable battery and/or power cable.

The memory module 210 desirably includes the database 134. In one example, the memory module 210 comprises a plurality of sub-databases focusing on different applications and/or user attributes. For instance, as shown in FIG. 2, the memory module 210 may include a web browsing history database 212, a search history database 214, a maps history database 216, an address book database 218, an e-mail archive database 220, and a calendar entries database 222. Other information, such as credit card transaction information, may be stored in other sub-databases.

The information stored in each of these sub-databases may be associated with specific programs or types of applications, or with the user's overall operation of the device. For instance, the web browsing history and search history databases may be associated with one or more web browsers such as the Internet Explorer, Safari, Firefox or Chrome web browsers. The maps history database may also be associated with the web browsers or other applications such as Google Earth. The address book and e-mail archive databases may be linked to the user's messaging application, such as Google's Gmail or Microsoft Outlook. The calendar entries database may similarly be linked to the messaging application or other application such as Google Calendar. While a number of different sub-databases have been identified above, other sub-databases which may contain location-related information may also be employed, such as the database associated with Google Latitude, a tool which lets users share their current location with friends.

Figure 3:
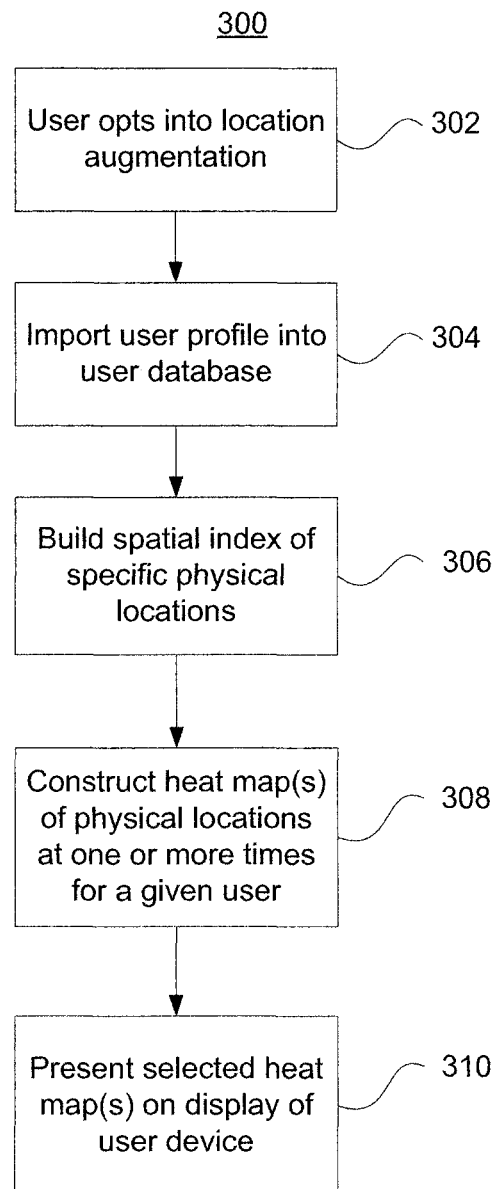
FIG. 3 is a flow diagram of a location augmentation application in accordance with aspects of the present invention.

In one scenario, location-related information may be mined/extracted from the sub-databases on a regular basis or in response to a request. FIG. 3 illustrates one such scenario. In particular, FIG. 3 provides a flow diagram of an opt-in location augmentation application 300. Initially, at block 302, a user signs up for location augmentation. This may include the user providing authorization to use one or more of the sub-databases in memory module 210 of his/her user device. According to one example, the user may select specific sub-databases to which the application is granted access. For instance, the user may grant access to the address book database 218 but not to the e-mail archives database 220.

As shown in block 304, upon authorization a user profile is added to a user database, such as database 132 of FIG. 1A. The user database may include an index where each extracted location signal may be associated with a set of information including some or all of geographical tags or "geotags" (which could be items such as "my home" or a search term such as "coffee shop"), temporal information (e.g., time an event occurred, optional time that certain information may expire, and/or a degradation factor), and a score to suggest the confidence in that location. For example, a latitude/longitude location may have a higher confidence than a location that is extracted from an email message. In a spatial index, a single location may have aggregate information from multiple databases. In this case, the system may compute an aggregate confidence and score for that location.

Then, per block 306, a geolocation module builds a spatial index which may provide location corrections and reverse geocoding. With regard to the former application, the geolocation module may gain access to the various sub-databases previously authorized by the user and use certain information to create one or more "heat maps" of specific physical locations at different times for a given user, as shown in block 308. And as shown in block 310, the heat maps may be presented on the user device's display.

Figure 4:
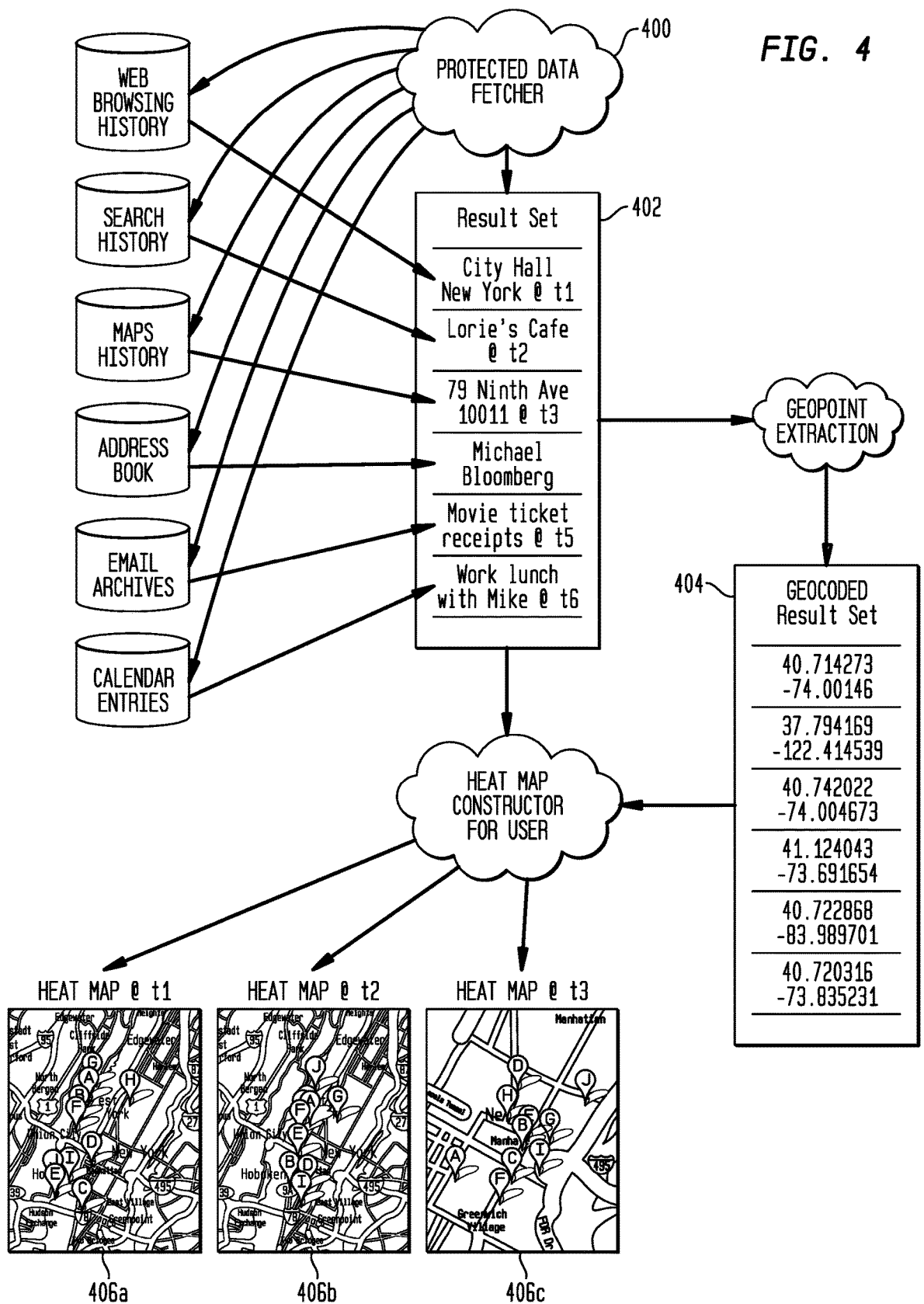
FIG. 4 illustrates operation of a geolocation module in accordance with aspects of the present invention.

FIG. 4 illustrates an example of how the geolocation module may perform a location correction process or augmentation. The module may include an application operating on server 104 of FIG. 1A. Or, alternatively, the geolocation module may be part of the user device architecture 200. The geolocation module may operate locally, on the server-side, or as a distributed module both locally and on the server. A server-only implementation may be more efficient and accurate because it would be able to use the entire corpus of data available in the databases 132 and 134. As shown in FIG. 1, a geolocation module 136 may be associated with or otherwise incorporated into the server 104. Alternatively, a local implementation may involve prefetching of data which is most applicable to the user's current location and applying the same inference algorithm locally. FIG. 2 illustrates a geolocation module 224 as part of the user device's architecture 200.

A cache could be incorporated on the user's device which mirrors the most relevant server-side profile. In this case, there would be little difference between the server-side and local implementations, just the amount of input data available. For a local implementation, a secure central server gateway may be employed to fetch the data from relevant sub-databases, and transfer the data to the client. In other words, the client device would not need to directly make fetch requests to different server-side databases.

The geolocation module includes a protected data fetcher 400 that is configured to communicate with the sub-databases. The protected data fetcher 400 extracts a result set 402 from the sub-databases. It may require authentication of the user or authorization by the sub-databases. In one example, the protected data fetcher 400 searches for any geographical information associated with the sub-databases. For instance, it may search web pages and search histories for geographical data.

Each result may correspond to a given physical location, person, activity and/or time. Thus, in one example mining of the web browsing history database 212 may result in a location ("City Hall, New York") and a time (t1). Mining of the search history database 214 may also result in a location ("Lorie's Café") and a time (t2). And mining of the maps history database 216 may result in a location ("79 Ninth Ave 10011") and a time (t3). Examination of the address book database 218 may result in a name ("Michael Bloomberg"), while examination of the e-mail archives database 220 may result in an activity ("Movie ticket receipts") and a time (t5). And examination of the calendar entries database 222 may result in an activity ("Work lunch with Mike") and a time (t6).

As shown in block 404, the geolocation module performs a geopoint extraction process on the result set 402, creating a geocoded result set 404. In one example, the geocoded result set 404 contains references to specific physical locations in latitude/longitude format. A forward geocoder may be used to convert an address into the latitude/longitude format. As discussed above with regard to block 306, a spatial index is constructed which contains the latitudes and longitudes. The spatial index may contain a properly formatted version of a physical address, such as a street address, corresponding to the latitude and longitude. The spatial index may also include time information, such as the time a web page was accessed or a search query was performed. Similar timing information may be collected for the other sub-databases. In another example, any information in the sub-databases which corresponds to geographical information, such as locations of known friends that a user travels with or is scheduled to meet, may be processed by the geolocation module.

The spatial index may include image tiles and associated data which are stored in a "quadtree" structure. The nodes of a quadtree data structure are referred to herein as "quadnodes." A quadnode plus one or more levels of descendents are referred to herein a "quadset." Data pertaining to quadtrees, quadnodes and quadsets may be stored in a database such as a KFF database, which may be maintained as database 132 of FIG. 1A.

The KFF or other database containing the spatial index is used to generate heat maps of particular physical locations as shown in FIG. 4. In particular, one or more heat maps of a region of interest are created using the geocoded result set 404. This may be done in conjunction with other data from result set 402, such as names of people, actions or events, and times. As shown, three heat maps 406*a*, 406*b* and 406*c* are generated for different times (e.g., times t1, t2 and t3). Some or all of these heat maps may be presented on the display of the user device according to input from the user, such as via the user interface/display module 204 of FIG. 3. In this example, the different pushpins (e.g., A-J) may represent a ranked list of points of interest for each heat map. Thus, as the time changes, the points of interest may change, and also different points of interest may be more or less relevant at different times. Thus, as shown, the pushpins A-J change across the various heat maps.

Figure 5:
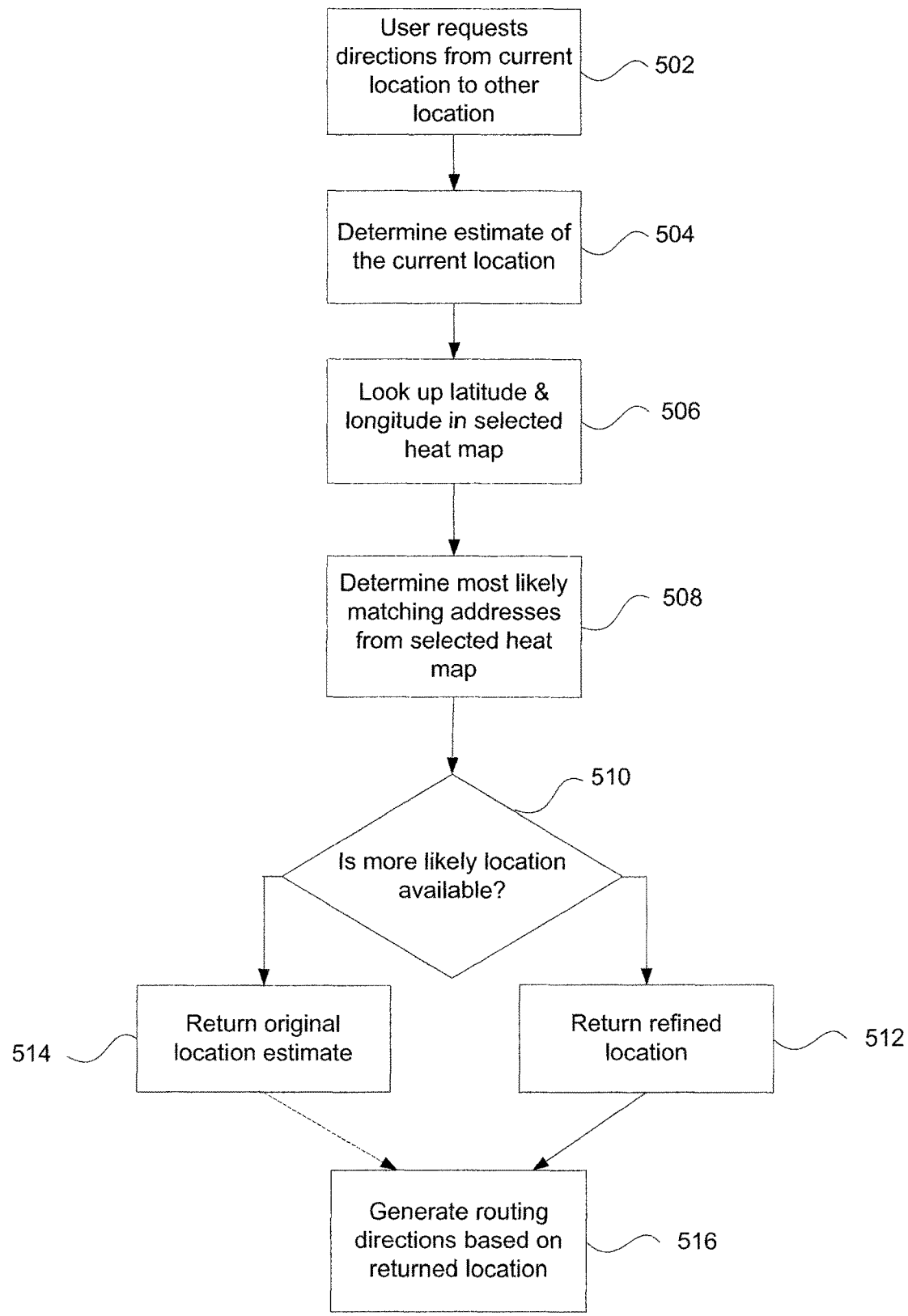
FIG. 5 is a flow diagram of a location refinement application in accordance with aspects of the present invention.

FIG. 5 illustrates another embodiment of the present invention. In particular, FIG. 5 presents a flow diagram 500 for refining a position location estimate. In one example, a user requests directions between two locations from a mapping application, such as Google Maps, as shown in block 502. In this case, the user may not know his/her specific position, and the request is for directions from a current location.

As shown in block 504, an estimate of the current location is then determined, and may be presented to the user on the device's display. The current location of the user may be estimated through a number of techniques. Depending on the particular type of user device and network, GPS, cell tower triangulation, WiFi triangulation, IP geocoding or other techniques may be employed. The current location may also be inferred from historical information as well. For example, if the user is known to be a certain location at time X every day, then there is a strong chance they'd be in the same location on a given day in the future. This may be determined by calendar or address book entries, e-mail archives, GPS results from prior usage of the user's device, or from other information.

The initial estimate may include a position in latitude/longitude coordinates, and may also include an estimate of accuracy. The accuracy may depend on a number of factors. For instance, if the user's device is a GPS enabled mobile phone, the accuracy of the GPS position is affected by the number of GPS satellites observed by the mobile phone. In the case of a WiFi network or cellular system, triangulation or other location technique may depend on terrain conditions (e.g., hilly or lots of nearby buildings), signal strength, weather conditions and time of year. The accuracy may be determined by the user's device itself, by the network, or both.

Next, as shown in block 506, the estimated latitude and longitude are looked up in or otherwise compared to a heat map associated with the user. There may be multiple heat maps which have been generated for or otherwise associated with the user. Such heat maps may be for various places and times in the past, present and future. The geolocation module desirably uses a heat map for the current time when performing the lookup. Based upon the lookup, the geolocation module determines a set of relevant matching address(es) for the selected heat map, as shown in block 508. This may include one or more addresses.

The matching addresses may include frequency and timeliness scores or rankings. Frequency is determined by how often the same location appears in the same databases or across different databases. Timeliness is the frequency of occurrence at a particular time. So location X may appear at time t1 (e.g., Monday at 1 pm) more often that location Y, and location Y may occur more often at time t2 (eg., Monday at 11 pm). In this case, based on the current time of the user, either location X or Y may be used.

Scores may be determined by simply adding up the frequencies, or using a metric that assigns a weighted score based on the confidence of the sub-database. Thus, a maps search may be weighted higher than e-mail. A current location from latitude/longitude may be assigned the highest score because the user has been known to be physically present at that location. Another score signal would be how recent the data is. Here, if the data is too old ("stale"), it may receive a lower score or weighting, thereby introducing a degradation factor for time.

Next, as shown in block 510, it is determined whether a more likely location than the initial estimate is available. If there is a more likely location, a refined position ("best feature") is determined, as shown in block 512. In one example, the geolocation module analyzes all entries in a spatial index associated with the selected heat map that are within a certain distance of the initial latitude and longitude. This distance may be based on the initial accuracy or the density of the spatial index. From this, the geolocation module determines whether an entry in the spatial index is sufficiently close (e.g., a latitude/longitude pair within x meters of the initial estimate), sufficiently frequent and/or sufficiently recent (e.g., within y days from the date of the request). Preferably, the selection process is optimized for quality. If no suitable entries are found in the spatial index, the original location estimate is returned, as shown in block 514. Next, as shown in block 516, routing directions are generated based on the refined or original location and are provided to the user.

Figure 6:
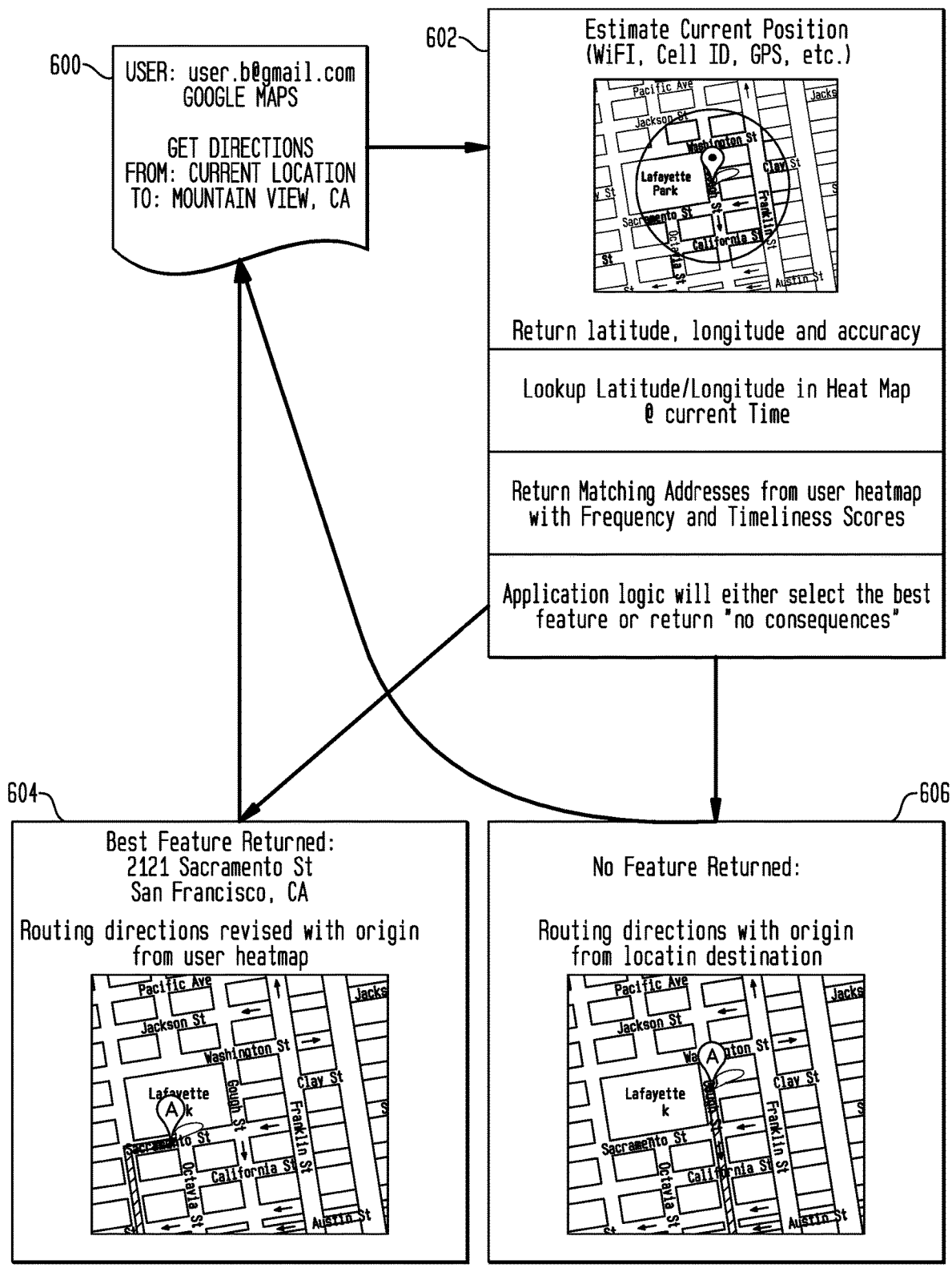
FIG. 6 illustrates additional operation of a geolocation module in accordance with aspects of the present invention.

This process is shown graphically in FIG. 6. Here, block 600 includes the user request to get directions from "Current Location" to Mountain View, Calif. As shown in block 602, an estimate of the user's current position is determined. A latitude/longitude estimate may be presented on the user device's display. The accuracy of the estimate may be illustrated by the circular region as shown.

Also shown in this block, the geolocation module looks up the latitude/longitude estimate in a heat map for the current time. The geolocation module returns the matching address(es) or returns a "no confidence" result as discussed above. If multiple matching addresses are provided, the geolocation module determines the best feature, i.e., the feature most likely to correspond with the user's present location. Then, as shown in block 604, routing directions are provided to the user based on the best feature. If no feature is returned, then block 606 shows that routing directions are provided to the user based on the original location estimate.

If the system is unable to narrow down the results to a single place, a list of the highest confidence results may be provided to the user so that the user may select between them instead of relying on the original location estimate. Also, apart from the example of providing enhanced driving directions to the user, other usage scenarios include seeking a more accurate location when searching around the user's location for businesses, people etc., for more accurately broadcasting the user's location to his/her friends, and for accurately geocoding any photographs a user has taken with his/her cellular phone.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A method for processing information for places of interest, comprising:
    analyzing at least one electronic database containing information about a selected user to determine whether the at least one electronic database includes geographical information;
    extracting, after determining the at least one electronic database includes geographical information, a result set from the geographical information in the at least one electronic database, the result set including one or more items of the geographical information and corresponding time information for each item of geographical information in the result set;
    performing geopoint extraction on the result set to obtain specific physical locations for each item of geographical information in the result set, each of the specific physical locations being associated with the corresponding time information of the item of geographical information from which the specific physical location was extracted;
    constructing a first heat map of a geographic region, the first heat map containing a first subset of the specific physical locations associated with corresponding time information within a first time range, wherein the first subset of the specific physical locations are ranked based on the corresponding time information and presented as a ranked list on a first map of the geographic region;
    constructing a second heat map of the geographic region, the second heat map containing a second subset of the specific physical locations associated with corresponding time information within a second time range, the second time range being different than the first time range, wherein the second subset of the specific physical locations are ranked based on the corresponding time information and presented as a ranked list on a second map of the geographic region; and
    outputting the first and second heat maps for simultaneous display.

2. The method of claim 1, further comprising:
    constructing a spatial index containing the specific physical locations and, for each specific physical location, the corresponding time information from which the specific physical location were extracted; and
    determining a confidence score for each of the specific physical locations in the spatial index.

3. The method of claim 2, wherein the confidence score is determined based on an accuracy of the geopoint extraction.

4. The method of claim 2, wherein the corresponding time information for each of the items of geographical information indicates at least one of a time an event occurred and a time that selected information about the event expired.

5. The method of claim 4, wherein the one or more heat maps of the geographical area display different subsets of the specific physical locations based upon the ranked results in the spatial index.

6. A processing system for processing geographical information, comprising:
    at least one processor;
    a geolocation module associated with the at least one processor; and
    memory for storing data, the memory electrically coupled to the at least one processor;
    wherein the geolocation module is configured to:
        analyze at least one electronic database containing information about a selected user to determine whether the at least one electronic database includes geographical information;
        extract, after determining the at least one electronic database includes geographical information, a result set from the geographical information in the at least one electronic database, the result set including one or more items of the geographical information and corresponding time information for each item of geographical information in the result set;
        perform geopoint extraction on the result set to obtain specific physical locations for each item of geographical information in the result set, each of the specific physical locations being associated with the corresponding time information of the item of geographical information from which the specific physical location was extracted;
        construct a first heat map of a geographic region, the first heat map containing a first subset of the specific physical locations associated with corresponding time information within a first time range, wherein the first subset of the specific physical locations are ranked based on the corresponding time information and presented as a ranked list on a first map of the geographic region;
        construct a second heat map of the geographic region, the second heat map containing a second subset of the specific physical locations associated with corresponding time information within a second time range, the second time range being different than the first time range, wherein the second subset of the specific physical locations are ranked based on the corresponding time information and presented as a ranked list on a second map of the geographic region; and
        output the first and second heat maps for simultaneous display.

7. The processing system of claim 6, wherein the geolocation module is further configured to transmit at least one of the heat maps to an authorized user for presentation on a display of a user device.

8. The processing system of claim 6, wherein the geolocation module includes a protected data fetcher for communicating with the at least one electronic database, the protected data fetcher being configured to search the at least one electronic database for geographical data contained in web pages and search histories.

9. The processing system of claim 6, wherein the geolocation module is further configured to:
    construct a spatial index containing the specific physical locations and, for each specific physical location, the corresponding time information from which the specific physical location were extracted, wherein the specific physical locations maintained in the spatial index correspond to latitude and longitude coordinates of physical addresses.

10. The processing system of claim 6, further comprising:
constructing a spatial index containing the specific physical locations and, for each specific physical location, the corresponding time information from which the specific physical location were extracted; and
determining a confidence score for each of the specific physical locations in the spatial index.

11. The processing system of claim 10, wherein the confidence score is determined based on an accuracy of the geopoint extraction.

12. The processing system of claim 10, wherein the corresponding time information for each of the items of geographical information indicates at least one of a time an event occurred and a time that selected information about the event expired.

13. The processing system of claim 12, wherein the one or more heat maps of the geographical area display different subsets of the specific physical locations based upon the ranked results in the spatial index.

14. A non-transitory computer-readable medium storing instructions executable by one or more processors to perform a method comprising:
analyzing at least one electronic database containing information about a selected user to determine whether the at least one electronic database includes geographical information;
extracting, after determining the at least one electronic database includes geographical information, a result set from the geographical information in the at least one electronic database, the result set including one or more items of the geographical information and corresponding time information for each item of geographical information in the result set;
performing geopoint extraction on the result set to obtain specific physical locations for each item of geographical information in the result set, each of the specific physical locations being associated with the corresponding time information of the item of geographical information from which the specific physical location was extracted;
constructing a first heat map of a geographic region, the first heat map containing a first subset of the specific physical locations associated with corresponding time information within a first time range, wherein the subset of the specific physical locations are ranked based on the corresponding time information and presented as a ranked list on a first map of the geographic region;
constructing a second heat map of the geographic region, the second heat map containing a second subset of the specific physical locations associated with corresponding time information within a second time range, the second time range being different than the first time range, wherein the second subset of the specific physical locations are ranked based on the corresponding time information and presented as a ranked list on a second map of the geographic region; and
outputting the first and second heat maps for simultaneous display.

15. The non-transitory computer-readable medium of claim 14, wherein the method further comprises:
constructing a spatial index containing the specific physical locations and, for each specific physical location, the corresponding time information from which the specific physical location were extracted; and
determining a confidence score for each of the specific physical locations in the spatial index.

16. The non-transitory computer-readable medium of claim 15, wherein the confidence score is determined based on an accuracy of the geopoint extraction.

17. The non-transitory computer-readable medium of claim 15, wherein the corresponding time information for each of the items of geographical information indicates at least one of a time an event occurred and a time that selected information about the event expired.

18. The non-transitory computer-readable medium of claim 17, wherein the one or more heat maps of the geographical area display different subsets of the specific physical locations based upon the ranked results in the spatial index.

* * * * *